2,728,777

PRODUCTION OF 5(4-HYDROXYBUTYL) HYDANTOIN

Donald D. Coffman, West Chester, Pa., and Mark W. Farlow, Wilmington, Del., assignors to E. I. du Pont de Nemours & Company, Wilmington, Del., a corporation of Delaware No Drawing. Application September 24, 1953, Serial No. 382,194

5 Claims. (Cl. 260—309.5)

This invention relates to a new process for the production of 5(4-hydroxybutyl)hydantoin. More particularly, it relates to the production thereof by the catalytic hydrogenation of 5(2-furyl)hydantoin.

It is accordingly an object of this invention to provide a new process for the production of 5(4-hydroxybutyl)-hydantoin. It is another object to produce 5(4-hydroxybutyl)hydantoin by the catalytic hydrogenation of 5(2-furyl)hydantoin. Other objects of the invention will appear hereinafter.

According to H. Adkins, "Reactions of Hydrogen," The University of Wisconsin Press (1944), pages 134–135, the reactions of hydrogen with furanoid compounds may involve hydrogenolysis and condensation as well as hydrogenation. Furfural over nickel or copper-chromium oxide is converted to tetrahydrofurfuryl alcohol at 150° C. to 160° C. while at temperatures above 175° C. the ring is broken and the products are pentanediols 1,2 and 1,5. If the reaction is pressed these glycols are converted to amyl alcohols. With nickel at 150° C. to 160° C. tetrahydrofurfuryl alcohol is also the main product but varying small amounts of methyl furan may also be obtained. Furylacrolein with nickel yields beta-furyl propionaldehyde by saturation of the carbon-carbon double bond in the side chain or 3-tetrahydrofuryl propanol-1, by saturation of the carbon-carbon unsaturation in the ring and side chain and reduction of the aldehydo carbonyl group.

It has now been unexpectedly discovered that hydrogen in the presence of a base metal hydrogenation catalyst selectively attacks the furyl residue in 5(2-furyl)hydantoin to yield 5(4-hydroxybutyl)hydantoin.

This invention accordingly provides a new route to 5(4-hydroxybutyl)hydantoin which consists in reacting 5(2-furyl)hydantoin with hydrogen at a temperature in excess of 100° C. in the presence of a hydrogenation catalyst containing a base metal, oxide, or salt thereof.

The process of this invention may be conveniently operated as follows: A pressure reactor is charged with the 5(2-furyl)hydantoin, a reaction medium, and at least 1% of a base metal hydrogenation catalyst. The reactor is then swept with oxygen-free nitrogen, placed on an agitating rack, pressured with hydrogen to at least 10 atmospheres, and the charge heated to at least 100° C. After hydrogen absorption has ceased, the reactor is permitted to cool. The reactor is opened and the contents are discharged and filtered to remove the catalyst. The desired 5(4-hydroxybutyl)hydantoin is isolated by recrystallization or by other means well known to those skilled in the art.

The example which follows is submitted to illustrate and not to limit this invention.

*Example*

A mixture of 5(2-furyl)hydantoin, ethyl alcohol, and an alloy-skeleton nickel catalyst in the approximate weight ratio of 4:16:1 is charged into a conventional pressure hydrogenation vessel. After five hours at 150° C. and 1000 atmospheres pressure of hydrogen with continuous agitation, hydrogen absorption is complete. The vessel is cooled, the excess hydrogen is vented, and the whole product is discharged. The resultant slurry is warmed and filtered to remove the catalyst, and the catalyst is washed with hot ethyl alcohol. Evaporation of the whole liquid filtrate to dryness produces a solid residue which is recrystallized from water to obtain 5(4-hydroxybutyl)-hydantoin, M. P. 146–149° C. On further recrystallization, the melting point is raised to 151–152° C. From four parts of 5(2-furyl)hydantoin, there is obtained 2.7 parts of 5(4-hydroxybutyl)hydantoin.

Substitution of alloy-skeleton cobalt in the above example gives similar results.

Replacement of the alloy-skeleton nickel catalyst in the above example with a nickel molybdite catalyst prepared as in U. S. Patent No. 2,572,300 gives similar results.

Although the example has illustrated batch operation, it is to be understood that the hydrogenation can be carried out as a semi-continuous or a continuous up-flow, down-flow, co-current, or counter-current vapor or liquid phase operation.

Irrespective of the mode of operation, the hydrogenation of the 5(2-furyl)hydantoin is effected at temperatures in the range of 100° C. to 250° C., but because of improved reaction rates it is preferred to use temperatures of from 125° C. to 200° C.

The process may be operated at pressures in excess of 10 atmospheres but because reaction rate and yield are improved by increasing the pressure to at least 100 atmospheres, the use of such pressure conditions is preferred. Generally raising the pressure beyond about 2000 atmospheres does not result in any practical advantages and therefore represents a practical upper pressure limit.

In the process of this invention, there may be used any base metal hydrogenation catalyst. Particularly good results are obtained with the base metals of group VIII of the periodic table, especially nickel. These catalysts may be used as the free metals in pyrophoric or stabilized form, or they may be in the massive state, in the form of pellets, or as fine powders, and may be unextended or extended on inert supports such as silica, pumice, kieselguhr, carbon, magnesia, etc. Such metal catalysts may be prepared by the hydrogen reduction of such compounds as the carbonate, oxide, or hydroxide alone or admixed with oxygenated compounds of other metals known to form hydrogenating oxides, for example, copper, zinc, etc., or they may be made by extracting with alkali the alkali-soluble component of an alloy of nickel or cobalt with an alkali-soluble metal as described in U. S. Patent No. 1,628,190 or by reducing a cobalt or nickel salt with sodium naphthalene as described in U. S. Patent No. 2,177,412. Stabilization of pyrophoric metals may be achieved by exposure of the pyrophoric metal to an oxidizing atmosphere, while maintaining the temperature of the catalyst mass below 50° C. Supported catalysts may be prepared by adding the supporting material during the catalyst preparation or by forming the support during the catalyst preparation.

Other useful catalysts are the molybdites described in U. S. Patent No. 2,572,300, and the chromites of U. S. Patents Nos. 1,746,782 and 1,964,001.

In batch operation, the amount of catalyst used is at least 1% of the 5(2-furyl)hydantoin charged. Generally at least 10% of catalyst is used in order to increase the rate of reaction. The upper limit of catalyst concentration is governed by practical considerations but generally no advantages accrue from the use of amounts exceeding 100% of the 5(2-furyl)hydantoin charged into the reactor. In continuous operation, the catalyst concentration is considerably in excess of the amount of material being processed at any one time but the total amount processed exceeds the catalyst concentration.

In order to facilitate contact between the hydrogen and the 5(2-furyl)hydantoin, it is preferred to hydrogenate in the presence of a reaction medium and suitable media are water, alcohols, e. g., methanol, ethanol, and the like, ethers, etc.

The amount of reaction medium employed is that required to render the reaction mixture fluid under the conditions of reaction. Generally an amount of solvent ranging from 25% to 500% of the 5(2-furyl)hydantoin is used, although there is nothing critical about this and amounts outside this range can be employed.

The process of this invention is a valuable advance in the art inasmuch as it makes accessible 5(4-hydroxybutyl)hydantoin, an intermediate in the synthesis of lysine.

Throughout the specification and claims, any reference to parts, proportions and percentages refers to parts, proportions and percentages by weight unless otherwise specified.

Since it is obvious that many changes and modifications can be made in the above-described details without departing from the nature and spirit of the invention, it is to be understood that the invention is not to be limited to said details except as set forth in the appended claims.

We claim:

1. The process for the production of 5(4-hydroxybutyl)hydantoin which comprises contacting 5(2-furyl)-hydantoin with hydrogen under pressure and an elevated temperature in the presence of an active hydrogenation catalyst from the class consisting of nickel and cobalt catalysts.

2. The process for the production of 5(4-hydroxybutyl)hydantoin which comprises contacting 5(2-furyl)-hydantoin with hydrogen under a pressure of at least 10 atmospheres and a temperature of at least 100° C. in the presence of an active hydrogenation catalyst from the class consisting of nickel and cobalt catalysts.

3. The process for the production of 5(4-hydroxybutyl)hydantoin which comprises contacting 5(2-furyl)-hydantoin with hydrogen under a pressure of between 10 and 2000 atmospheres and a temperature of between 100° C. and 250° C. in the presence of an active hydrogenation catalyst from the class consisting of nickel and cobalt catalysts.

4. The process for the production of 5(4-hydroxybutyl)hydantoin which comprises contacting 5(2-furyl)-hydantoin with hydrogen under a pressure of between 10 and 2000 atmospheres and a temperature of between 100° C. and 250° C. in the presence of an active nickel-containing hydrogenation catalyst.

5. The process for the production of 5(4-hydroxybutyl)hydantoin which comprises contacting 5(2-furyl)-hydantoin with hydrogen under a pressure of between 10 and 2000 atmospheres and a temperature of between 100° C. and 250° C. in the presence of an active cobalt-containing hydrogenation catalyst.

References Cited in the file of this patent

UNITED STATES PATENTS

| 2,033,292 | Lazier | Mar. 10, 1936 |
| 2,460,747 | Henze | Feb. 1, 1949 |
| 2,557,904 | Britton et al. | June 19, 1951 |